United States Patent [19]

Kopich

[11] Patent Number: 4,497,399
[45] Date of Patent: Feb. 5, 1985

[54] ADJUSTING MECHANISM FOR A MANUALLY OPERATED CLUTCH

[75] Inventor: Leonard F. Kopich, Madison Heights, Mich.

[73] Assignee: General Motors Corporation, Detroit, Mich.

[21] Appl. No.: 446,715

[22] Filed: Dec. 3, 1982

[51] Int. Cl.³ .............................................. F16D 13/75
[52] U.S. Cl. .................................. 192/111 A; 74/512; 188/196 BA
[58] Field of Search .................. 192/70.25, 111 A; 188/196 F, 196 D, 196 BA; 74/512

[56] References Cited

U.S. PATENT DOCUMENTS

| | | | |
|---|---|---|---|
| 2,752,009 | 6/1956 | MacDougall | 188/196 BA |
| 3,177,983 | 4/1965 | McGregor | 188/196 BA |
| 3,429,412 | 2/1969 | Wobrock | 74/512 X |
| 4,181,209 | 1/1980 | Wheaton | 192/111 A |
| 4,227,603 | 10/1980 | Fasano | 74/512 X |
| 4,249,644 | 2/1981 | Urban | 192/111 A X |
| 4,424,890 | 1/1984 | Duethman | 192/111 A |

Primary Examiner—Rodney H. Bonck
Attorney, Agent, or Firm—Donald F. Scherer

[57] ABSTRACT

A manually operated clutch adjusting mechanism has a worm and gear sector drive connection between the manual pedal and the operating cable. The cable urges the gear sector to rotate about its axis when a clutch adjustment is necessary. Rotation of the sector gear causes linear movement of the worm which is connected to a one-way linear to rotary motion transfer mechanism. The linear movement of the worm results in rotation of the worm and therefore the sector gear. The rotation of the sector gear induced by the worm gear is in the same direction as that urged by the cable and therefore reduces the clutch load on the cable and adjusts the clutch accordingly.

2 Claims, 6 Drawing Figures

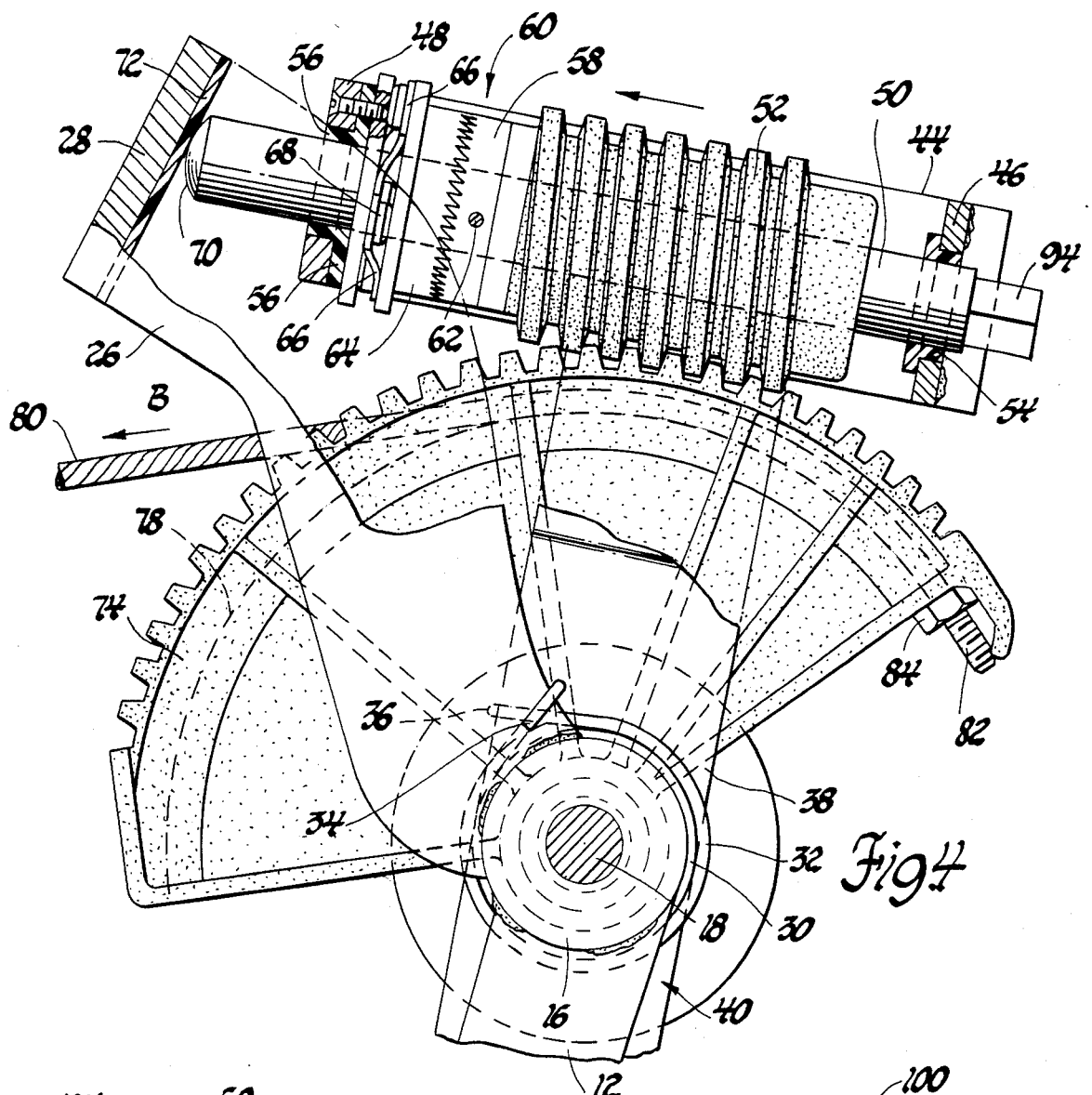
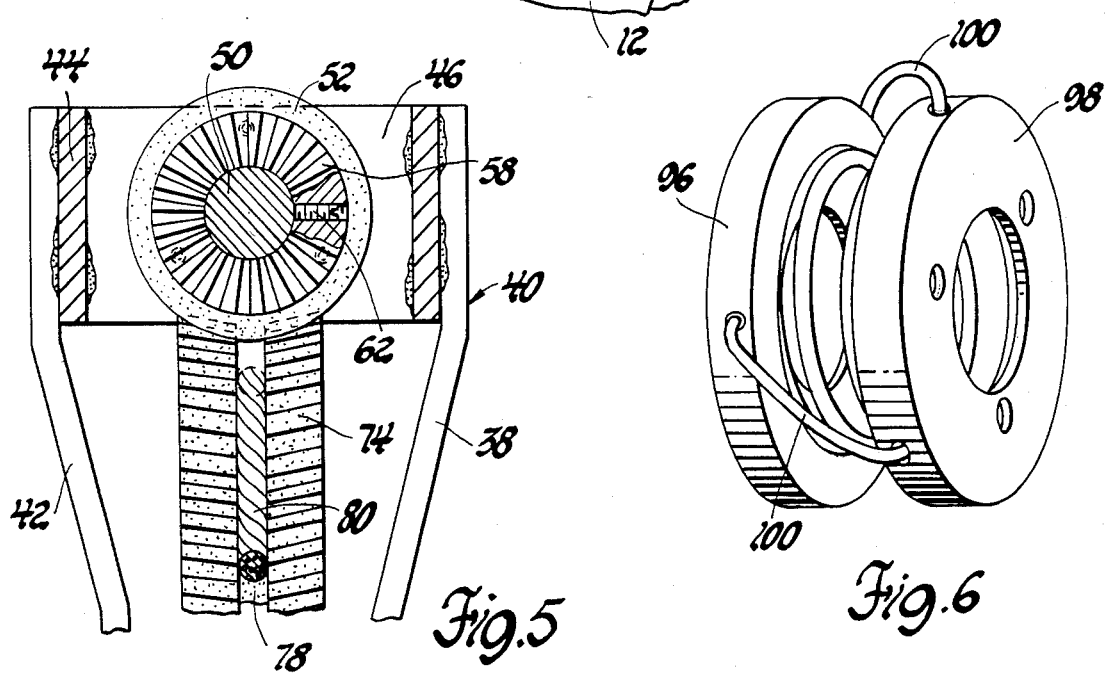

ADJUSTING MECHANISM FOR A MANUALLY OPERATED CLUTCH

This invention relates to clutch mechanisms and more particularly to clutch adjusting mechanisms for manually operated clutches.

The prior art clutch adjusting mechanisms utilized with cable operated clutches generally provide a ratchet mechanism or disconnecting mechanism which permits the cable to move relative to the clutch pedal. In such devices, the cable is momentarily out of driving connection with the clutch pedal. The present invention provides a clutch adjusting mechanism for a cable operated clutch wherein the cable and clutch pedal are in continuous driving connection.

It is therefore an object of this invention to provide an improved clutch adjusting mechanism for a cable operated clutch wherein excess cable force induces a worm and sector gear arrangement to become operable so as to permit controlled relative movement between the clutch pedal and the cable to reduce cable loading.

It is another object of this invention to provide an improved adjustment mechanism for a manually operated clutch wherein a cable member is operatively connected to a sector gear which is in turn connected through a worm to the clutch pedal and wherein there is provided a one-way drive mechanism which will selectively rotate the worm during clutch engagement whenever the loading on the cable induced by the clutch spring exceeds a predetermined value.

It is a further object of this invention to provide an improved clutch adjusting mechanism wherein a sector gear and worm member are interconnected such that clutch misadjustment results in rotation of the sector gear which induces linear movement of the worm gear on its supporting shaft and wherein a one-way drive mechanism including resilient torque arms converts the linear motion of the worm to rotary motion which in turn is transmitted to the sector gear resulting in an adjustment to the clutch mechanism.

These and other objects and advantages of the present invention will be more apparent from the following description and drawings in which:

FIG. 4 is an enlarged view of a portion of FIG. 1;

FIG. 5 is an enlarged view taken along line 5—5 of FIG. 1; and

FIG. 6 is an isometric view showing another embodiment of a portion of the mechanism.

Figure 1:
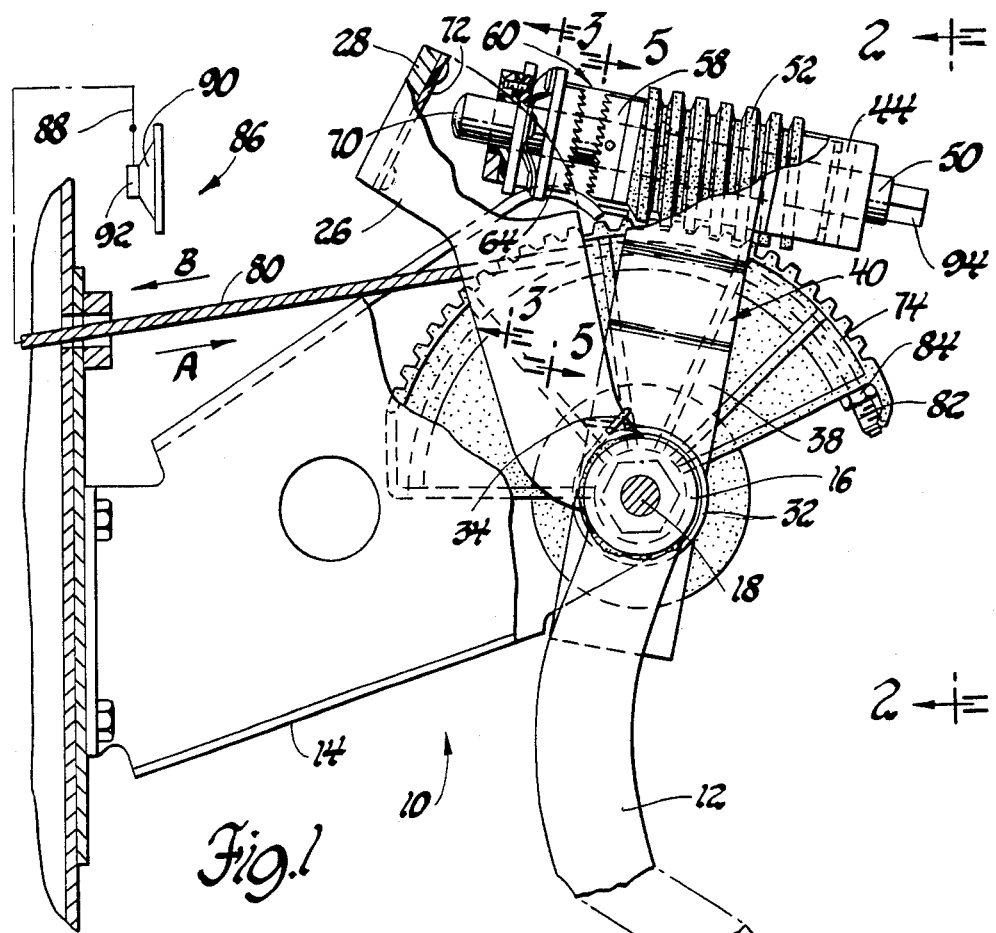
FIG. 1 is an elevational view of a clutch operating mechanism.

Referring now to the drawings, wherein like characters represent the same or corresponding parts throughout the several views, there is seen in FIG. 1 a clutch operating mechanism, generally designated 10, having a clutch pedal 12 pivotally mounted on a bracket 14 which is secured to the vehicle body.

Figures 2, 3:
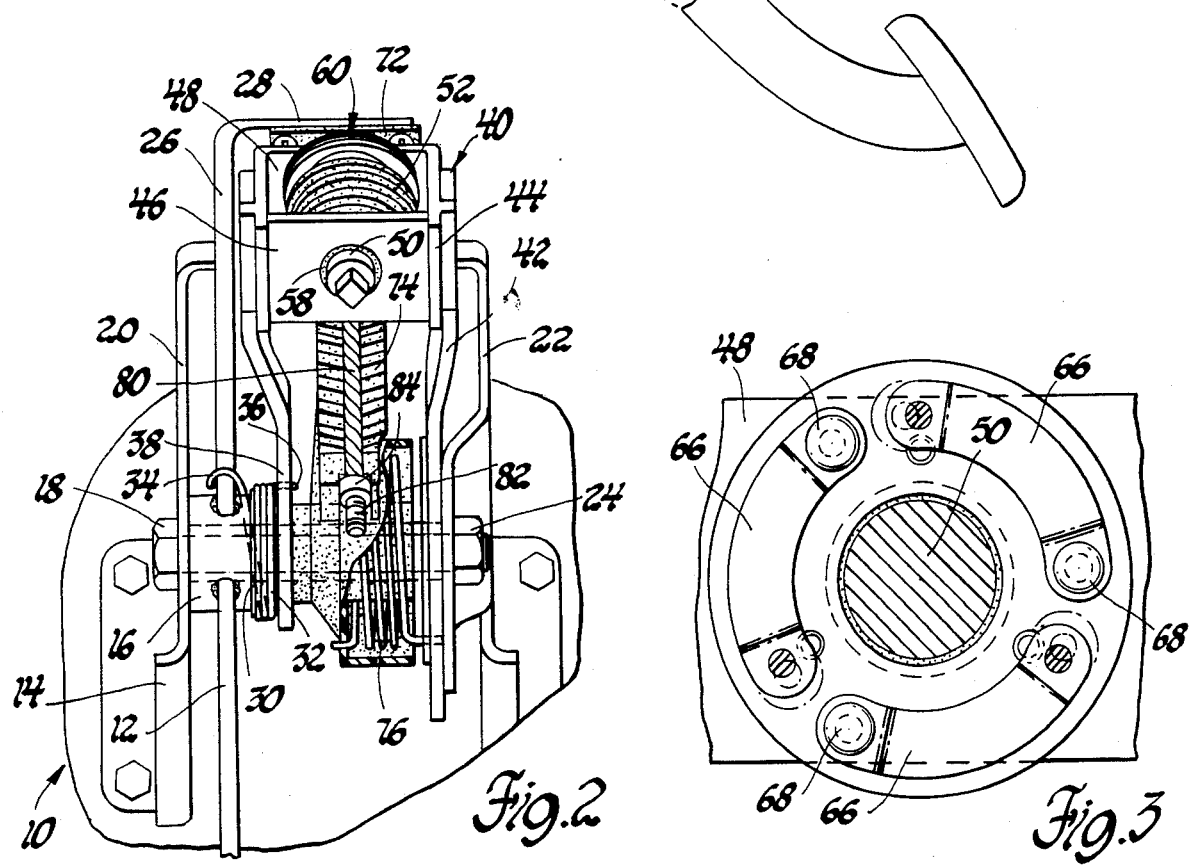
FIG. 2 is a view taken along line 2—2 of FIG. 1.
FIG. 3 is an enlarged view taken along line 3—3 of FIG. 1.

The clutch pedal 12 is rotatably supported on a bushing 16, as best seen in FIG. 2, which bushing 16 is supported on a bolt member 18. The bushing 16 has sufficient length to extend between sidewalls 20 and 22, respectively, of the bracket 14 such that the tightening of a fastener 24 on bolt 18 is limited by the length of bushing 16 whereby the space between sidewalls 20 and 22 is controlled. The pedal 12 has formed integrally therewith a pedal extension 26 which terminates in a pad portion 28.

The bushing 16 includes a flange portion 30 about which is disposed a torsion spring 32 which has one end 34 connected to the pedal extension 26 and the other end 36 connected to a leg 38 which is rotatably supported on the bushing 16. The leg 38 is part of a worm housing, generally designated 40, which also includes another leg 42 rotatably supported on the bushing 16 and a rectangular supporting structure 44 disposed between the legs 38 and 42.

The rectangular supporting structure 44 has a pair of end walls 46 and 48 in which is disposed a shaft 50 on which is mounted for rotation therewith a worm 52. The shaft 50 is supported in bushings 54 and 56 secured to the end walls 46 and 48, respectively. These bushings 54 and 56 permit both linear and rotary motion of the shaft 50. Also secured to the shaft 50 is a driven member 58 of a jaw clutch, generally designated 60. The member 58 is secured to the shaft 50 by a set screw 62. The jaw clutch 60 has a drive member 64 which is rotatably supported on the shaft 50 and drivingly connected to one end of a plurality of resilient torque arms 66. The other end of torque arms 66 are secured by respective fasteners 68 to the end wall 48 of the rectangular supporting structure 44. The shaft 50 has a rounded end portion 70 which, as seen in FIG. 4, is adapted to abut a stop pad 72 secured to the pad portion 28.

The worm 52 meshes with a gear sector 74 which is rotatably supported on the bushing 16. The sector gear 74 is resiliently connected to leg 42 of housing 40 by a torsion spring 76. As viewed in FIG. 1, the torsion spring 76 urges clockwise rotation of sector gear 74 relative to housing 40 while the torsion spring 32 urges clockwise rotation of housing 40 relative to clutch pedal 12. These two spring members 32 and 76 are operable to urge return motion of the clutch pedal 12.

The sector gear 74 has a central groove portion 78 accommodating a cable 80 which, as seen in FIGS. 1, 2 and 4, has a threaded end 82 on which is disposed a fastener 84. The fastener 84 is operable to position the threaded end 82 of cable 80 relative to the sector gear 74. Fastening mechanisms other than the threaded type can be utilized to provide the cable positioning.

The cable 80 is connected to a conventional friction clutch mechanism, generally designated 86, which includes an operating lever 88 and a Belleville or diaphragm spring 90. As is well-known, the lever 88 operates on the spring 90 through a throwout bearing 92 to control engagement and disengagement of the friction clutch. As viewed in FIG. 1, when the cable 80 is moved in the direction of Arrow A by clockwise rotation of pedal 12, the clutch 86 will become disengaged. This will increase the load as diaphragm spring 90 imposes on the throwout bearing 92. When the clutch pedal is released, the diaphragm spring 90 will cause the cable to move in the direction of Arrow B and through torsion spring 76 and 32 resulting in counterclockwise rotation of pedal 12.

If the clutch 86 is within the design limits for adjustment, the jaw clutch 60 will be disengaged when the clutch 86 is fully engaged as seen in FIG. 1. The leg 42 of housing 40 contacts the bracket 14 and thus limits the movement of worm housing 40 in the counterclockwise direction.

If the clutch is not properly adjusted, the cable 80 will continue to move in the direction of Arrow B after the worm housing has contacted the stop on bracket 14.

This movement of cable 80 will result in counterclockwise rotation of sector gear 74 as viewed in FIGS. 1 and 4. The rotation of sector gear 74 will result in linear movement of worm gear 52 and shaft 50 in the bushings 54 and 56.

During this linear movement, the jaw clutch 60 will become engaged and after engagement thereof, will also move linearly with the worm 52. However, linear movement of the jaw clutch 60 will result in bending of the torque arms 66 toward the wall 48. Since the torque arms 66 must maintain their length, the bending thereof will result in rotary displacement of the drive member 64 of jaw clutch 60. Driven member 58 will also rotate. This will result in rotation of worm gear 52 in a clockwise direction as seen in FIG. 5. This rotation of worm 52 will cause counterclockwise rotation of sector 74 as viewed in FIG. 4. The rotation of sector 74 will result in linear movement of cable 80 in the direction of Arrow B and thereby provide clutch adjustment.

This adjustment will continue as necessary each time the clutch pedal goes through a cycle of depression by the operator to disengage the clutch and released by the operator to engage the clutch. The clutch adjustment occurs during clutch engagement. During clutch disengagement when the operator is depressing clutch pedal 12 to cause clockwise rotation about bolt 18, the jaw clutch 60 opens to the position shown in FIG. 1. The teeth on jaw clutch 60 are shaped such that during the opening motion drive forces are not transmitting and thus a one-way drive is provided.

It should be appreciated from the foregoing description that the drive connection between the clutch pedal and the cable is continuous even during the clutch adjusting phase. It should also be noted that the shaft 50 has a square end 94 which will permit a tool to be connected thereto so that the clutch can be manually adjusted.

FIG. 6 is a representation of another embodiment of the torque arm mechanism disposed between drive member 64 and end wall 48. The mechanism shown in FIG. 6 has a pair of collars 96 and 98 which are connected by a plurality of arms 100. The arms 100 can pivot at their connections to their respective collars such that as the collars 96 and 98 are moved together linearly, relative rotation therebetween will occur. To install the torque arm mechanism shown in FIG. 6 into the clutch adjusting mechanism shown in FIGS. 1 through 5, collar 96 is secured to end wall 48 and collar 98 is secured to the drive member 64. The adjustment of the clutch using this torque arm mechanism will be identical to the adjustment procedure described above for torque arms 66.

It should be appreciated that in reviewing the above disclosure that clutch adjustment will occur only when necessary. If the clutch is properly adjusted, the cable 80 will not have sufficient load thereon to permit extended counterclockwise rotation of sector gear 74 such that operation of the jaw clutch 60 will not occur.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A clutch adjustment mechanism for a manually operated vehicle clutch having a control cable subject to increased clutch applying spring force when clutch misadjustment is present and a manual pedal pivotally mounted on a bracket secured to the vehicle, said mechanism comprising; a toothed sector resiliently connected to the manual pedal and secured to one end of the control cable; a housing pivotally mounted on the bracket; a shaft slidably and rotatably disposed in said housing with at least one end thereof extending through one end of the housing; a worm disposed on the shaft for rotation therewith and being in mesh with said toothed sector; a two member one-way jaw clutch disposed between said worm and the one end of the housing with one member of the clutch being secured to said shaft and the other member being rotatably disposed on said shaft; and torque arm means secured between said housing and said other member for rotating said other member as said other member is moved linearly with said shaft relative to said housing when said jaw clutch is engaged; said jaw clutch being operable to transmit rotation in one direction only to said worm through said shaft, said cable being operable when the vehicle clutch is engaged to rotate said sector relative to said pedal when said clutch is misadjusted to move said worm and shaft resulting in engagement of said jaw clutch and operation of said adjustment mechanism, and said manual pedal contacting said shaft for linear movement thereof toward disengagement of said jaw clutch when said vehicle clutch is disengaged thereby permitting indexing of said jaw clutch.

2. A clutch adjustment mechanism for a manually operated vehicle clutch having a control cable subject to increased clutch apply spring force when clutch misadjustment is present and a manual pedal pivotally mounted on a bracket secured to the vehicle, said mechanism comprising: a toothed sector resiliently connected to the manual pedal and secured to one end of the control cable; a housing pivotally mounted on the bracket; a shaft slidably and rotatably disposed in said housing with at least one end thereof extending through one end of the housing; a worm disposed on the shaft for rotation therewith and being in mesh with said toothed sector; a one-way jaw clutch disposed between said worm and the one end of the housing and having one member thereof secured to said shaft and another member thereof rotatably disposed on said shaft; and torque arm means secured between said housing and said other member for rotating said other member as said other member is moved linearly with said shaft relative to said housing when said jaw clutch is engaged; said jaw clutch being operable to transmit rotation in one direction only to said worm through said shaft, said cable being operable when the vehicle clutch is engaged to rotate said sector relative to said pedal when said clutch is misadjusted to move said worm and shaft resulting in engagement of said jaw clutch and operation of said adjustment mechanism, and said manual pedal contacting said shaft for linear movement thereof toward disengagement of said jaw clutch when said vehicle clutch is disengaged thereby permitting indexing of said jaw clutch.

* * * * *